United States Patent [19]

Yamasaki et al.

[11] Patent Number: 4,965,443

[45] Date of Patent: Oct. 23, 1990

[54] FOCUS DETECTION APPARATUS USING NEURAL NETWORK MEANS

[75] Inventors: Masafumi Yamasaki; Toshiyuki Toyofuku; Junichi Itoh, all of Hachioji; Shinichi Kodama, Hino, all of Japan

[73] Assignee: Olympus Optical Co., Ltd., Tokyo, Japan

[21] Appl. No.: 414,943

[22] Filed: Sep. 29, 1989

[30] Foreign Application Priority Data

Oct. 4, 1988 [JP] Japan ................................. 63-250466

[51] Int. Cl.$^5$ ............................................ G01J 1/20
[52] U.S. Cl. .................................. 250/201.7; 250/204
[58] Field of Search .................. 250/201.7, 201.6, 204; 356/1, 4; 354/402, 406, 407, 408, 431, 433, 410, 31

[56] References Cited

U.S. PATENT DOCUMENTS

| | | |
|---|---|---|
| 4,289,959 | 9/1981 | Takayama et al. |
| 4,314,150 | 2/1982 | Takayama et al. |
| 4,331,864 | 5/1982 | Nakajima et al. |
| 4,618,238 | 10/1986 | Maitani et al. ........................ 354/431 |
| 4,748,321 | 5/1988 | Ishida et al. ........................... 354/406 |
| 4,882,601 | 11/1989 | Taniguchi et al. ................ 250/201.7 |

Primary Examiner—David C. Nelms
Assistant Examiner—Que Tan Le
Attorney, Agent, or Firm—Frishauf, Holtz, Goodman & Woodward

[57] ABSTRACT

An optical image transmitted through a photographing lens is incident on a light-receiving unit of a two-dimensional matrix. An output from the light-receiving unit is input to a first arithmetic logic unit, and the first arithmetic logic unit calculates actual object brightness values in consideration of an aperture value of an aperture. An output from the first arithmetic logic unit is supplied to a multiplexer and a neural network. The neural network determines a main part of the object from a pattern of brightness values of the respective photoelectric transducer elements and outputs a position signal of the main part. The multiplexer selectively passes the brightness value of the photoelectric transducer element corresponding to the main part of the object from the outputs generated by the first arithmetic logic unit. An output from the multiplexer is supplied to a second arithmetic logic unit. The second arithmetic logic unit performs a focus detection calculation based on only the brightness of the main part. The photographing lens is moved along the optical axis, thereby performing a focusing operation.

10 Claims, 12 Drawing Sheets

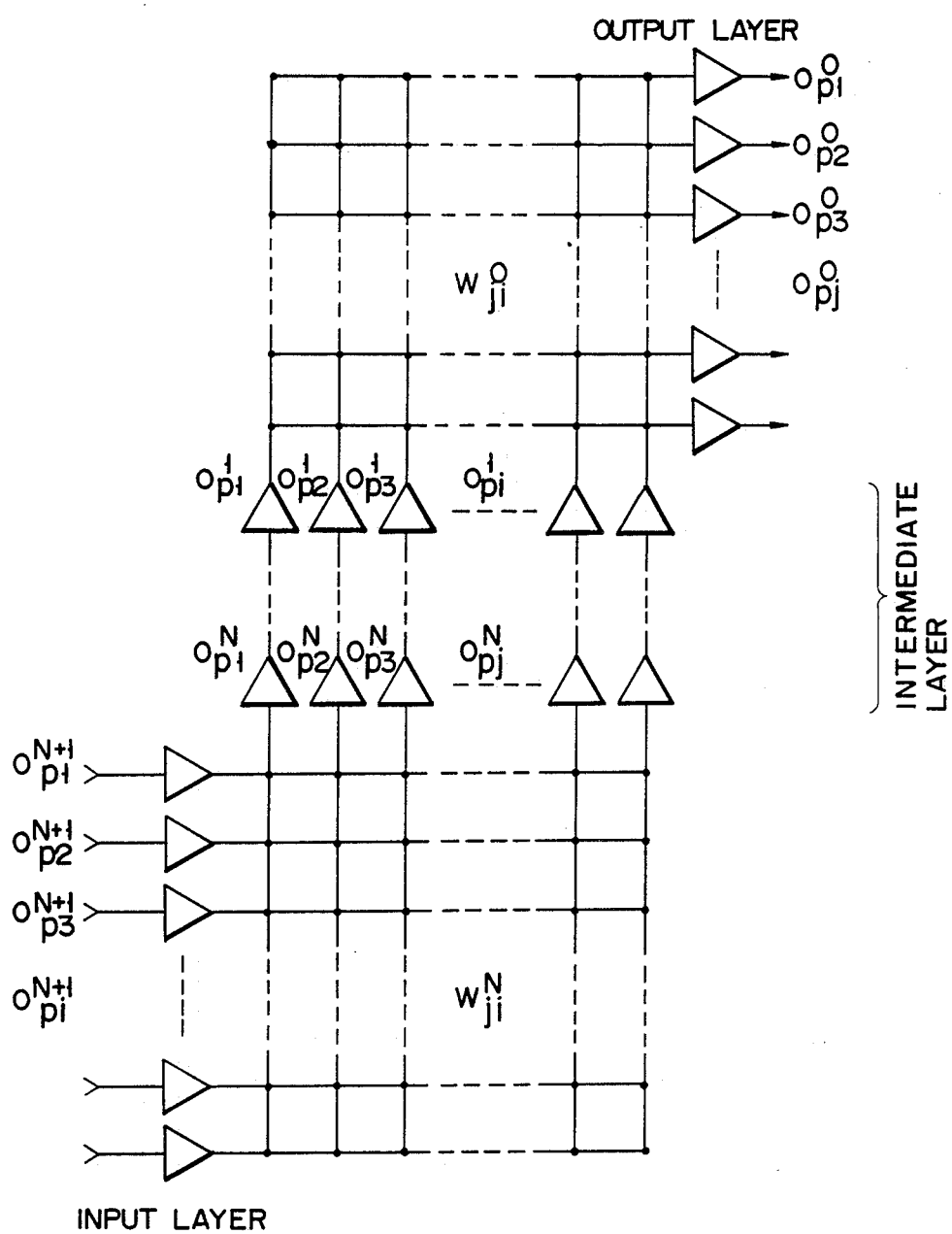
F I G. 2

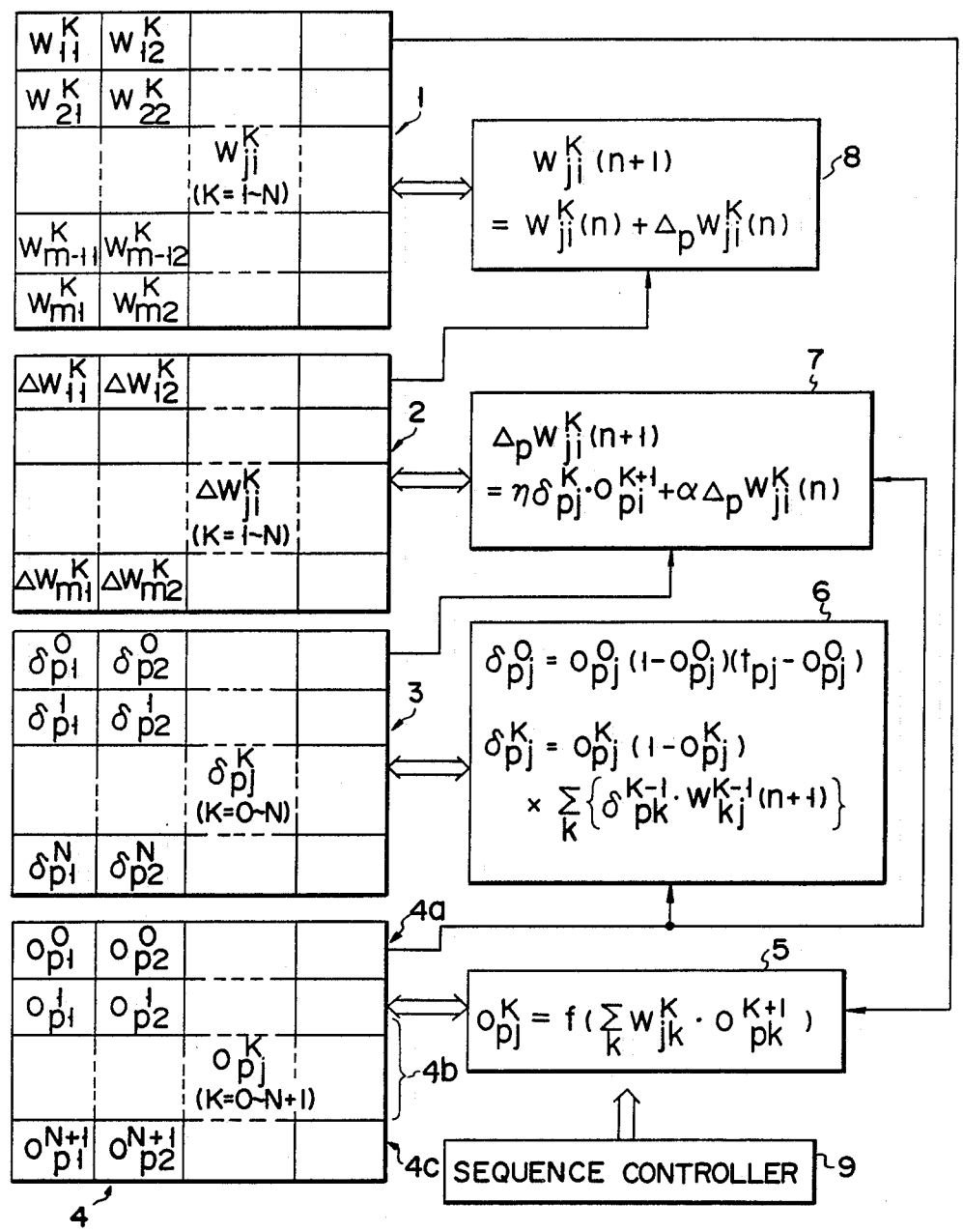
F I G. 5

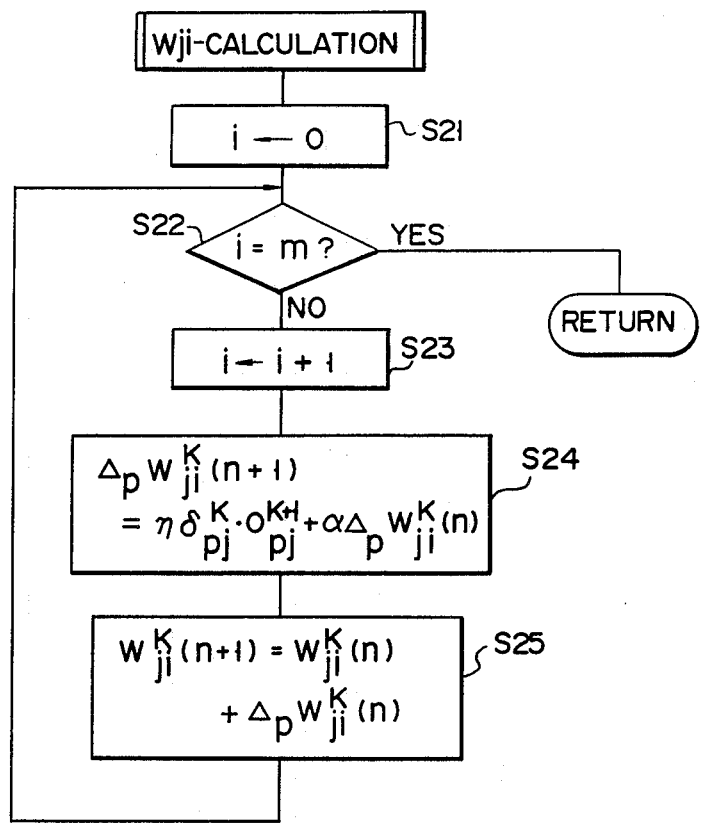
F I G. 8

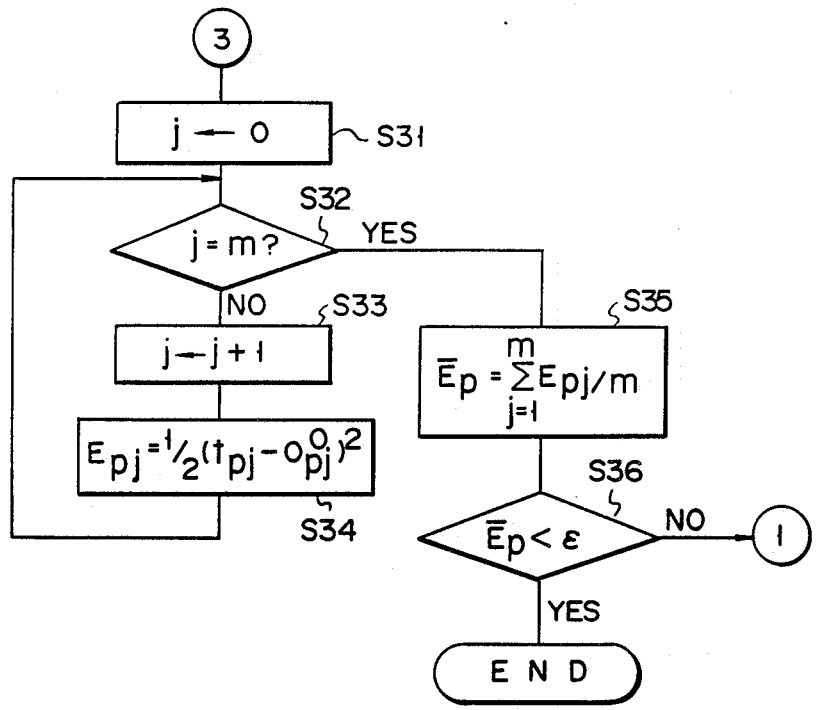
F I G. 9

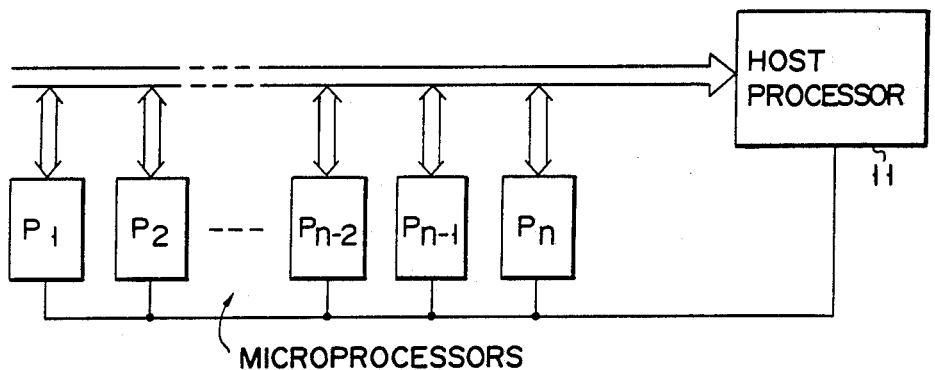
F I G. 10
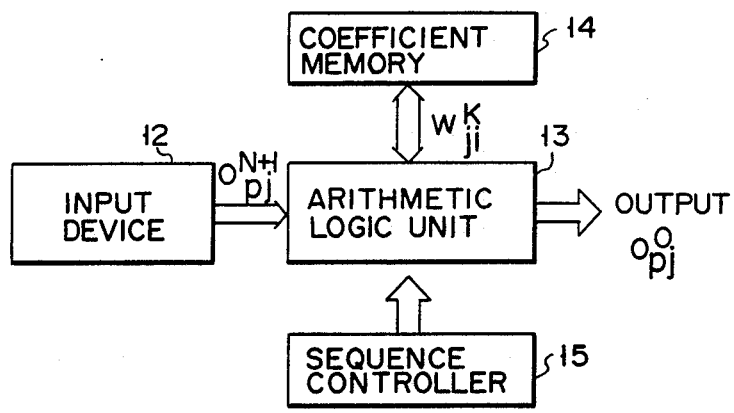
F I G. 11
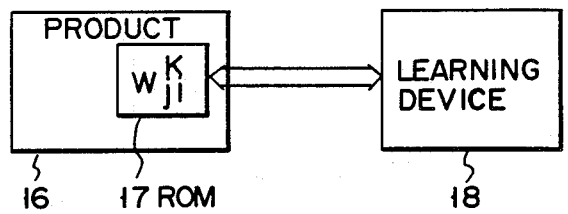
F I G. 12

| $P_{11}$ | $P_{12}$ | | | $P_{1n}$ |
|---|---|---|---|---|
| $P_{21}$ | $P_{22}$ | | | $P_{2n}$ |
| | | | | |
| | | | | |
| $P_{m1}$ | $P_{m2}$ | | | $P_{mn}$ |

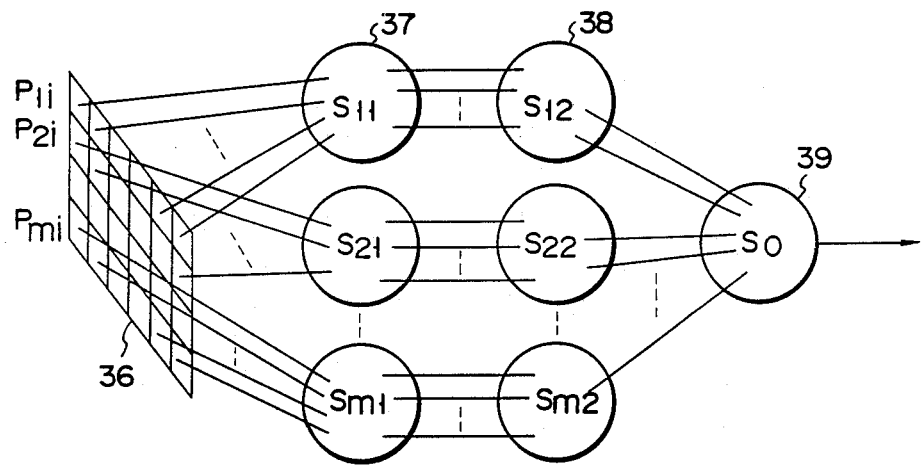
F I G. 15
| P11 | P12 | P13 | P14 | P15 | P16 | P17 |
| --- | --- | --- | --- | --- | --- | --- |
| P21 | P22 | P23 | P23 | P25 | P26 | P27 |
| P31 | P32 | P33 | P34 | P35 | P36 | P37 |
| P41 | P42 | P43 | P44 | P45 | P46 | P47 |
F I G. 16

FOCUS DETECTION APPARATUS USING NEURAL NETWORK MEANS

BACKGROUND OF THE INVENTION

1. Field of the Invention

The present invention relates to a focus detection apparatus capable of detecting focal points for all objects with accuracy to some extent.

2. Description of the Related Art

In most of cameras having conventional focus detection apparatuses, an object area to be focused is fixed to almost the center of the viewfinder, and framing cannot be designed freely. In order to solve this problem, Japanese Patent Disclosure No. 54-59964 discloses a means capable of arbitrarily changing an angle of direction of distance measurement, wherein an operation for changing the direction of distance measurement is synchronized with a displacement of a display member for displaying the direction of distance measurement. Japanese Patent Disclosure Nos. 59-107685 and 60-254968 disclose techniques for arbitrarily selecting a sampling interval of a brightness signal to focus on any object.

A cumbersome operation for selecting a focus area is required in these prior arts and is not suitable for high-speed photographing for a moving object. A mechanical focus detection technique results in a complicated mechanism and degradation of accuracy due to the mechanism.

SUMMARY OF THE INVENTION

It is an object of the present invention to provide a focus detection apparatus for allowing a neural network for generating desired outputs in response to various inputs to learn main parts of objects by using a large number of model patterns, thereby automatically focusing on a desired area for every object pattern.

The focus detection apparatus of the present invention comprises a light-receiving unit, having a plurality of photoelectric transducers arranged in a two-dimensional matrix, for outputting analog signals representing brightnesses of respective parts of an object; a converter for converting the analog signals output from the light-receiving unit into digital signals; a neural network for receiving the digital signals from the converter and determining a main part of the object; a multiplexer for selecting a signal representing the brightness value of the determined main part from the digital signals; and a device for performing focus detection on the basis of an output from the multiplexer.

BRIEF DESCRIPTION OF THE DRAWINGS

FIG. 2 is a view showing a model of a neural network used in the present invention;

FIG. 5 is a block diagram of a back propagation model type neural network;

FIGS. 6 to 9 are flow charts showing simulation for simulating the neural network of FIG. 5 by using a Neumann type computer, in which FIG. 6 is a flow chart for calculating an output of each unit, FIG. 7 is a flow chart for obtaining an amount of back propagation of an error, FIG. 8 is a flow chart for calculating a coupling strength coefficient, and FIG. 9 is a flow chart for judging a learning level;

FIG. 10 is a block diagram of a parallel processing system for realizing the neural network shown in FIG. 5;

FIG. 11 is a block diagram of an apparatus which applies a learning result;

FIG. 12 is a block diagram for causing the apparatus which applies a learning result to learn;

FIG. 15 is a view showing a neural network of the first embodiment;

FIG. 16 is a view showing the detailed layout of photoelectric transducer elements.

DETAILED DESCRIPTION OF THE PREFERRED EMBODIMENTS

Figure 1:
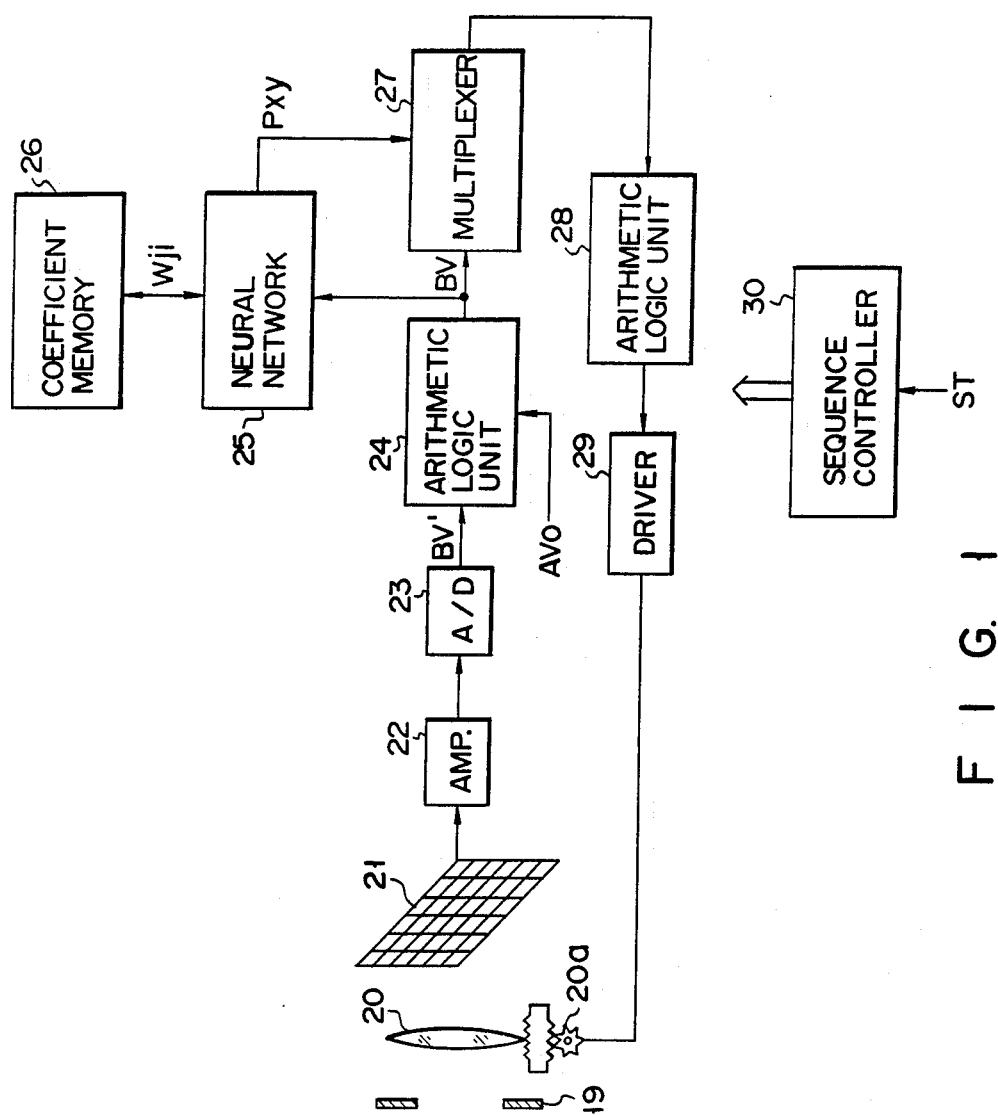
FIG. 1 is a block diagram of a focus detection apparatus according to a first embodiment of the present invention.

A focus detection apparatus according to an embodiment of the present invention will be described with reference to the accompanying drawings. FIG. 1 is a block diagram showing an arrangement of a first embodiment. As is apparent from FIG. 1, this embodiment uses a neural network to perform focus detection. The neural network will be described prior to a description of the embodiment with reference to FIGS. 2 to 12.

Figure 3:
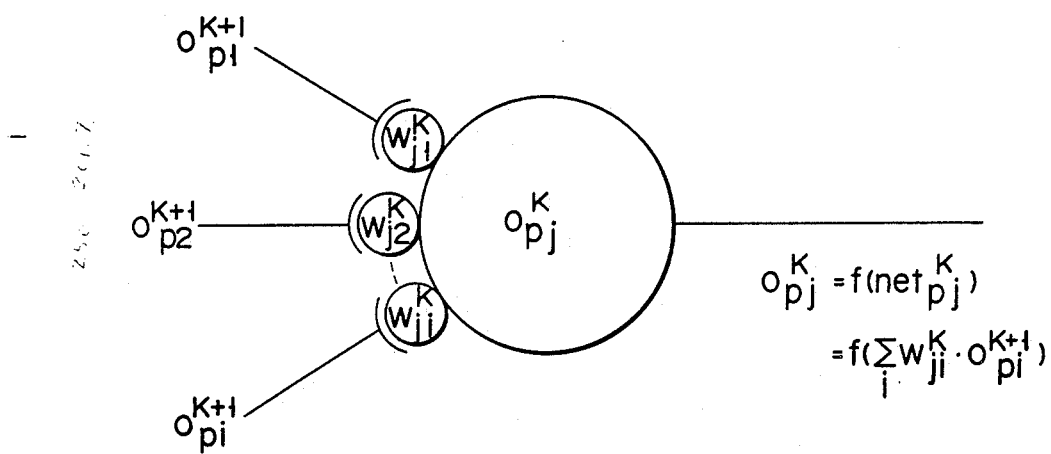
FIG. 3 is a view showing a model of each unit constituting the neural network.

FIG. 2 shows a model of a neural network. This model is proposed by Rumlhart et al and is called a back projection model (to be referred to as a BP model hereinafter). The neural network is formed of a large number of units (neurons). The units are classified into an input layer, an intermediate layer, and an output layer. The input and output layers are single layers, but the intermediate layer may be a single layer or a plurality of layers. The units are connected in a direction of the input layer, the intermediate layer, and the output layer in that order to constitute a network. The coupling strength between the units is determined by learning. However, there are no connections between the units within each layer. A model of each unit is shown in FIG. 3.

The principle of a learning algorithm of a BP model will be described below. An error $E_{pj}$ between an actual output value and a desirable output value is given as follows:

$$E_{pj} = 0.5(t_{pj} - O_{pj}^0)^2 \quad (1)$$

where $O_{pj}^0$ is the actual output value appearing at the output layer when a given pattern P is input to the input layer, and $t_{pj}$ is the desired output value (to be referred to as a teacher signal hereinafter) at that time.

In order to cause the network to learn, all the coupling strengths are changed to reduce the error $E_{pj}$.

A change in coupling strength coefficient $W_{ji}$ for the jth unit of the Kth layer from the ith unit of the (K−1)th layer upon input of the pattern P is defined as follows. In this case, K designates the layer and increases from the output layer side given a "0" toward the input layer side.

$$\Delta_p W_{ji}^k \propto -\partial E_p / \partial W_{ji}^k \quad (2)$$
$$\partial E_p / \partial W_{ji}^k$$
$$= (\partial E_p / \partial net_{pj}^k) \cdot (\partial net_{pj}^k / \partial W_{ji}^k) \quad (3)$$

for $net_{pj}^k = \sum_K W_{jk}^k \cdot O_{pk}^{k+1}$

Figure 4:
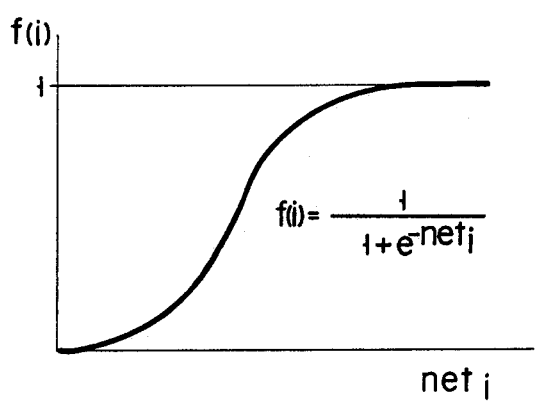
FIG. 4 is a view showing a logistic function.

When a logistic function is given as f(i) and $O_{pk}^k = f(net_{pk}^k)$, equation (3) can be rearranged as follows. The logistic (sigmund) function f(i) is shown in FIG. 4.

$$\partial E_{pj} / \partial W_{ji}^k = \delta_{pj}^k \cdot O_{pi}^{k+1} \quad (4)$$

where $\delta_{pj}^k$ is an amount of back propagation of an error in the Kth layer, i.e., $\delta_{pj}^k = -\partial E_{pj} / \partial net_{pj}^k$. Therefore, equation (2) can be rearranged as follows:

$$\Delta_p W_{ji}^k = \eta \cdot \delta_{pj}^k \cdot O_{pi}^{k+1} \quad (5)$$

where $\eta$ is a constant.

Since equations $E_{pj} = 0.5(t_{pj} - O_{pj}^0)^2$ and $O_{pj}^0 = f(net_{pj}^0)$ are established for the output layer, the amount of back propagation $\delta_{pj}^0$ of the output layer is defined as follows:

$$\delta_{pj}^0 = (t_{pj} - O_{pj}^0) \cdot f'(k \Sigma W_{jk}^0 \cdot O_{pk}^1) \quad (6)$$

Since there are no connections between the units within each layer, the amount of back propagation of the error of the intermediate layer is given as follows:

$$\delta_{pj}^k = -\partial E_p / \partial net_{pj}^k \quad (7)$$
$$= \sum_k \delta_{pk}^{k-1} \cdot \sum_i \{(\partial net_{pk}^{k-1} / \partial O_{pi}^k) \cdot (\partial O_{pi}^k / \partial net_{pj}^k)\}$$
$$= \sum_k \delta_{pk}^{k-1} (\partial net_{pk}^{k-1} / \partial O_{pj}^k) \cdot f'(net_{pj}^k)$$
$$= \sum_k \delta_{pk}^{k-1} \cdot W_{kj}^{k-1} \cdot f'(net_{pj}^k)$$
$$= \sum_k \delta_{pk}^{k-1} \cdot W_{kj}^{k-1} \cdot f' \left( \sum_k W_{jk}^k \cdot O_{pk}^{k+1} \right)$$

$\delta$ in equation (7) is a recursive function. $\Delta_p W_{ji}^k$ is given by a general mathematical expression as follows:

$$\Delta_p W_{ji}^k(n+1) = \eta \cdot \delta_{pj}^k \cdot O_{pi}^{k+1} + \alpha \cdot \Delta_p W_{ji}^k(n) \quad (8)$$

for $\Delta_p W_{ji}^k(0) = 0$ where n is the number of learning cycles. The second term of the right side of equation (8) is added to reduce variations in error and accelerate convergence. The coupling strength coefficient can be updated from equation (8) as follows:

$$W_{ji}^k(n+1) = W_{ji}^k(n) + \Delta_p W_{ji}^k(n) \quad (k=0, 1, 2, \ldots) \quad (9)$$

If the logistic function f(i) is defined as follows:

$$f(i) = 1/(1 + e^{-net_i}) \quad (10)$$

f'(i) = f(i){1 − f(i)} so that the amounts of back propagation of the errors can be simplified as follows:
for output unit:

$$\delta_{pj}^0 = O_{pj}^0 (1 - O_{pj}^0)(t_{pj} - O_{pj}^0) \quad (11)$$

for intermediate unit:

$$\delta_{pj}^k = O_{pj}^k (1 - O_{pj}^k) \cdot k \Sigma \{\delta_{pk}^{k-1} \cdot W_{kj}^{k-1}(n+1)\} \quad (12)$$

As is apparent from the above calculations, the $\Delta_p W_{ji}^k$-calculations are started from the units of the output layer and are shifted to the units of the intermediate layer. In this manner, learning is started in a direction opposite to the input data processing direction.

Learning by the BP model can be performed as follows. Learning data is input, and a calculation result is output. The coupling strength coefficients are changed to reduce the error of the result (i.e., the difference between the actual output and the teacher signal). Another learning data is input again. This operation is repeated until $\Delta_p W_{ji}^k$ is converged to zero.

FIG. 5 shows a basic circuit arrangement of a BP model neural network. A random access memory (to be referred to as a RAM hereinafter) 1 stores coupling strength coefficients $W_{ji}^k$ and has N pages for the K (1 to N) layers. A RAM 2 stores changes $\Delta_p W_{ji}^k$ in the coupling strength coefficient $W_{ji}^k$ when the pattern P is input to the neural network and has N pages, i.e., K=1 to N. A RAM 3 stores the amounts of back propagation $\delta_{pj}^k$ of the errors and has (N+1) pages, i.e., K=0 to N. A RAM 4 stores output values $O_{pj}^k$ of all units and has (N+1) pages, i.e., K=0 to N. A page 4a stores output values of the output layer, a page 4b stores output values of the intermediate layer and the input layer, and a page 4c stores input values of the input layer. An $O_{pj}^k$-arithmetic logic unit 5, a $\delta_{pj}^k$-arithmetic logic unit 6, a $\Delta_p W_{ji}^k$-arithmetic logic unit 7, and a $W_{ji}^k$-arithmetic logic unit 8 are connected to the RAMs 4, 3, 2, and 1, respectively. Reference numeral 9 denotes a sequence controller for controlling the overall sequence.

Figure 6:
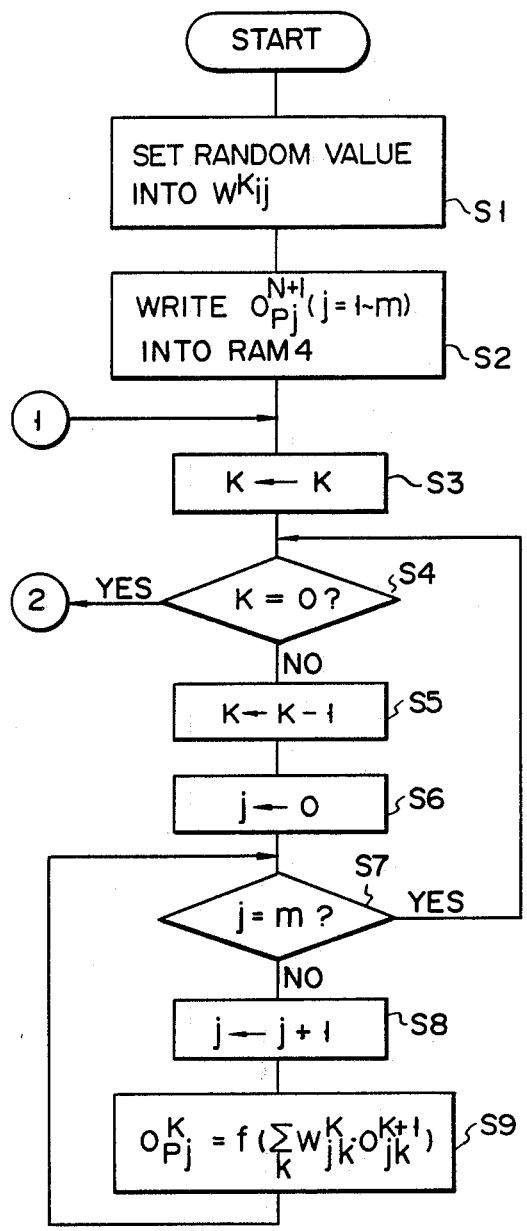

The learning process by the BP model shown in FIG. 5 will be described below. Simulation of the BP model by a Neumann type computer will be described with reference to flow charts of FIGS. 6 to 9. More specifically, FIG. 6 is a flow chart for calculating the output values $O_{pj}^k$, FIG. 7 is a flow chart for calculating the amount of back propagation $\delta_{pj}^k$ of the errors, FIG. 8 is a flow chart for calculating the coupling strength coefficients $W_{ji}^k$, and FIG. 9 is a flow chart for judging a learning level.

A random value is initially set in the coupling strength coefficient $W_{ji}^k$ in the RAM 1 in step S1. In step S2, the input values $O_{pj}^{N+1}$ (j=1 to m) are set in the RAM 4. The output values $O_{pj}^k$ of the respective units are calculated by the arithmetic logic unit 5 from the input layer to the output layer in steps S3 to S9.

Figure 7:
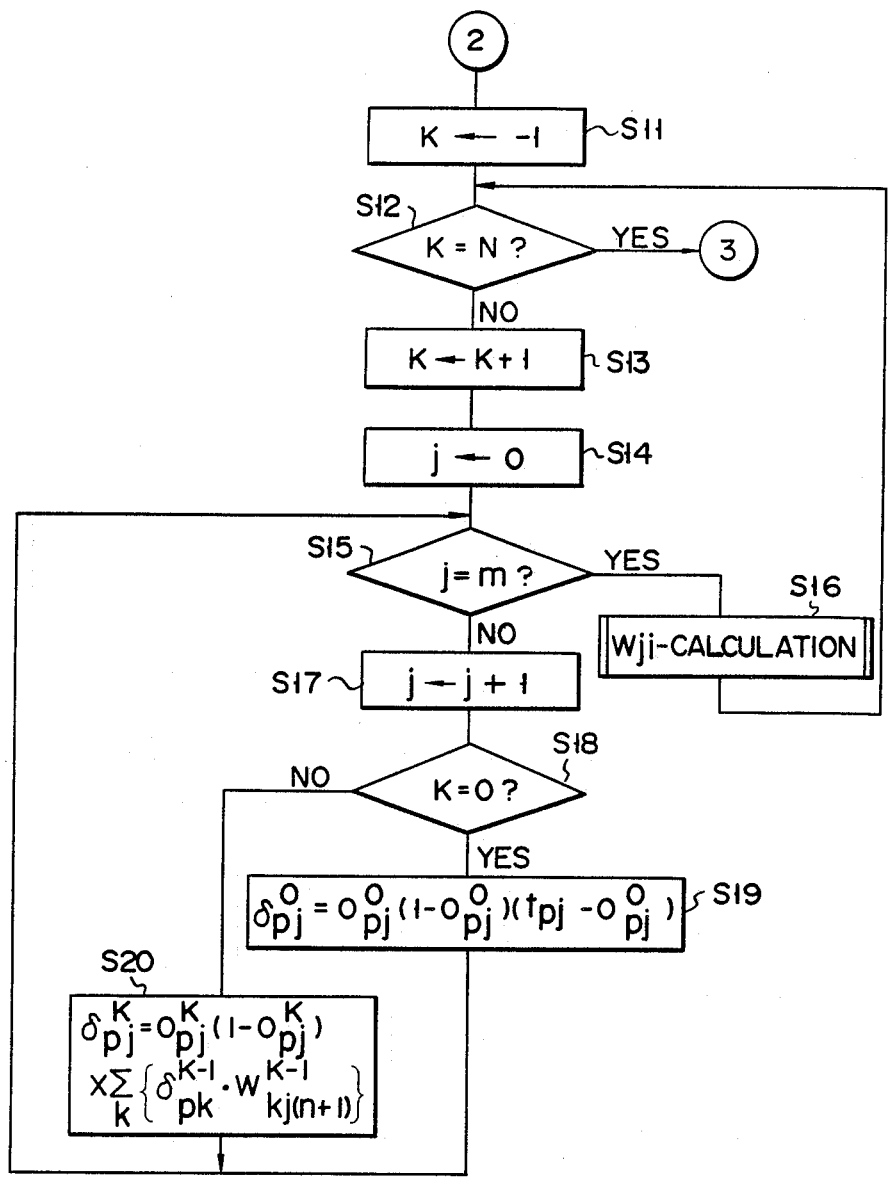

In steps S11 to S20 of FIG. 7, the amount of back propagation $\delta_{pj}^0$ of the errors are calculated in accordance with equation (11) using the output values $O_{pj}^0$ and the teacher signals $t_{pj}$ by the arithmetic logic unit 6.

In steps S21 to step S24 of FIG. 8, changes $\delta_p W_{ji}^0(1)$ in coupling strength coefficients are calculated by the arithmetic logic units 7 in accordance with equation (8). All initial values $\Delta_p W_{ji}^k(0)$ of the changes $\Delta_p W_{ji}^0$ are zero. The coupling strength coefficients $W_{ji}^0(1)$ are calculated by the arithmetic logic unit 8 in accordance with equation (9) in step S25. Therefore, all the $O_{pj}^0$, $\delta_{pj}^0$, $\Delta_p W_{ji}^0(1)$, and $W_{ji}^0(1)$ of the output layer are obtained. These data are stored to update the initial data in the RAMs 1 to 4.

Learning of the intermediate layer is then started. Referring back to the flow chart of FIG. 7, the data $\delta_{pj}^0$ and $W_{ji}^0(1)$ obtained by the arithmetic logic unit 6 and the data $O_{pj}^0$ stored in the RAM 4 are used to obtain the amount of back propagation $\delta_{pj}^k$ of the errors. As shown in the flow chart of FIG. 8, changes $\Delta_p W_{ji}^k(1)$ of the coupling strength coefficients are calculated by the arithmetic logic unit 7 in accordance with equation (8), and coupling strength coefficients $W_{ji}^k(1)$ are calculated by the arithmetic logic unit 8 in accordance with equation (9). The calculated data are stored to update the previous data in the RAMs 1 to 4 in the same manner as in the output layer. The above flow is sequentially repeated toward the input layer ($K=N+1$) to complete the first learning cycle.

The above learning cycle is repeated a plurality of times to determine the coupling strength coefficients $W_{ji}$ between the units. Therefore, a network for obtaining a desired output value $P_{pj}$ upon inputting of the input value $O_{pj}$ representing the given pattern P can be automatically formed.

FIG. 9 is a flow chart for calculating a mean square error $\overline{E}_p$ between an actual output value $O_{pj}$ and the teacher signal $t_{pj}$. When the mean square error $\overline{E}_p$ is decreased, the actual output value becomes close to the desirable output value. If the error $\overline{E}_p$ is smaller than a threshold value s relating to a degree of learning or a learning level, learning is completed. Otherwise, learning is repeated.

Learning for one input pattern P has been described above. However, in the exposure control apparatus learning is performed to output a plurality of output patterns corresponding to a plurality of input patterns. Alternatively, it is possible to perform learning to output one specific output pattern in response to a plurality of input patterns.

The above BP model can be realized by a Neumann type computer used in existing industrial equipment. However, with this arrangement, a high-speed function by parallel processing as one of the advantages of the neural network cannot be achieved. For this reason, the operations in FIGS. 6 to 9 are preferably parallel-processed by a plurality of computers.

FIG. 10 shows a configuration of a parallel processing system. A plurality of microprocessors $P_1$ to $P_n$ are connected to a host processor 11. The neural network shown in FIG. 2 is divided into local networks which are respectively controlled by the microprocessors $P_1$ to $P_n$. The host processor 11 controls operation timings of the microprocessors $P_1$ to $P_n$ and combines data dispersed in the microprocessors $P_1$ to $P_n$ to perform processing such as pattern recognition. Each of the microprocessors $P_1$ to $P_n$ performs calculations of a plurality of continuous arrays of the output values $O_{pj}$ shown in FIG. 5, such as $O_{p1}, O_{p2}, \ldots$ The microprocessors $P_1$ to $P_n$ comprise RAMs and arithmetic logic units which are required to calculate the corresponding output values and store the necessary data $\delta_{pj}$, $\Delta W_{ji}$, and $W_{ji}$. When the calculations of all the units shared by the microprocessors are completed, all the microprocessors $P_1$ to $P_n$ synchronously communicate with each other to update the data. The host processor 11 determines the achieved learning level and controls the operation timings of the microprocessors $P_1$ to $P_n$.

When processing such as pattern recognition is performed on the basis of the learning result, a calculation $O_{pj}^k = f(k \Sigma W_{jk}^k \cdot O_{pk}^{k+1})$ is performed from the input layer to the output layer in FIG. 2, thereby obtaining a final output value $O_{pj}^0$. In this case, as shown in FIG. 11, distributed processing by a plurality of microprocessors is performed to achieve a high-speed operation by parallel processing of the neural network.

The circuit shown in FIG. 5 is basically required during learning. However, when a learning result is simply applied, its arrangement can be extremely simplified.

FIG. 11 is a basic circuit arrangement in this case. Input data is input to an arithmetic logic unit 13 through an input device 12 (e.g., an A/D converter), and the arithmetic logic unit 13 sequentially performs calculations $O_{pj}^k = f(k \Sigma W_{jk}^k \cdot O_{pk}^{k+1})$ to obtain output data $O_{pj}^0$. A coefficient memory 14 for storing the coupling strength coefficient $W_{ji}^k$ comprises a ROM or a programmable ROM.

FIG. 12 is a schematic block diagram of a learning system for manufacturing a product to which the learning result is applied. A product 16 incorporates a coefficient memory (ROM) 17 which stores a coupling strength coefficient $W_{ji}^k$. Reference numeral 18 denotes a learning device. A combination of the ROM 17 and the learning device 18 is basically the same as the circuit shown in FIG. 5. When data $W_{ji}^k$ is written in the ROM 17, the product 16 is disconnected from the learning device 18.

The same learning process need not be repeated for identical products. In this case, the ROM 17 may be copied and used for other identical products.

In the above description, learning of the BP model and an application of the learning result are realized by simulation using the existing Neumann type computer because a complicated algorithm is required during learning and it is very difficult for hardware to automatically self-systematize coupling strength coefficients of connections between the units. However, if the coupling strength coefficients $W_{ij}$ are known and the application is limited to a machine which employs the learning result, the BP model shown in FIG. 2 can be constituted by hardware. This concept must be utilized when a high-speed operation is performed by parallel processing and when the BP model is applied to low-end industrial products. This can be achieved by constituting each unit in FIG. 2 by an inverter and replacing the coupling strength coefficient $W_{ij}$ with a resistor network $R_{ij}$. This can be easily achieved by recent LSI techniques.

A focus detection apparatus which employs the neural network described above according to a first embodiment of the present invention will be described with reference to FIG. 1. An aperture 19 is located in front of a photographing lens 20. An object image transmitted through the aperture 19 is incident on a light-receiving unit 21 which is formed of photoelectric transducer elements $P_{mn}$ arranged in a two-dimensional matrix shown in FIG. 14. For this reason, brightness data of the object in a given closed state of the aperture 19 are output from the light-receiving unit 21 in units of photoelectric transducer elements. These outputs are amplified by an amplifier 22, and the amplified signals are converted into digital signals as BV' values by an A/D converter 23. The BV' values are supplied to an arithmetic logic unit (ALU) 24. The arithmetic logic unit 24 is a circuit for calculating actual BV values ($=BV'-AVo$). For this purpose, a fully open aperture value $AVo$ of the aperture 19 is input to the arithmetic logic unit 24.

The BV values output from the arithmetic logic unit 24 in units of photoelectric transducer elements are supplied to a multiplexer 27 and a neural network 25. A coefficient memory 26 is connected to the neural network 25. The multiplexer 27 selectively passes an output BV value of the photoelectric transducer element corresponding to the main part of the object from the all BV values in accordance with a control signal $P_{xy}$ from the neural network 25.

An output from the multiplexer 27 is supplied to an arithmetic logic unit 28. The arithmetic logic unit 28 performs calculations for focus detection in accordance with the climbing servo scheme using the brightness signal of the selected main part. An output from the arithmetic logic unit 28 is supplied to a driver 29. The driver 29 drives a focusing mechanism 20a on the basis of the output from the arithmetic logic unit 28, thereby moving the position of the photographing lens 20. A sequence controller 30 is arranged to perform overall control.

In this embodiment, a focal point is detected on the basis of not the brightness data of the entire object but the brightness data of only the main part of the object. Selection of the main part is determined by the neural network in correspondence with the brightness pattern of the object. For this reason, satisfactory focus detection can be performed for all objects. The main part of the object may cross a plurality of photoelectric transducer elements. In this case, an average value of the output BV values of the plurality of photoelectric transducer elements corresponding to the main part is calculated by the arithmetic logic unit 28.

The basic block arrangement of the neural network 25 shown in FIG. 5 may be used. However, in order to achieve high-speed learning, a parallel processing system shown in FIG. 10 should be used. When an object pattern as an input $O_{pj}{}^0$ is supplied to the network, a calculation $O_{pj}{}^k=f(_k\Sigma W_{jk}{}^k \cdot O_{pk}{}^{k+1})$ is performed, and finally a signal $P_{xy}$ representing the position of the main part of the object is output. In this manner, a coupling strength coefficient $W_{ji}$ of each unit is learnt by the network in advance. The coupling strength coefficients $W_{ji}$ obtained by learning are stored in the coefficient memory 26.

Figures 13, 14:
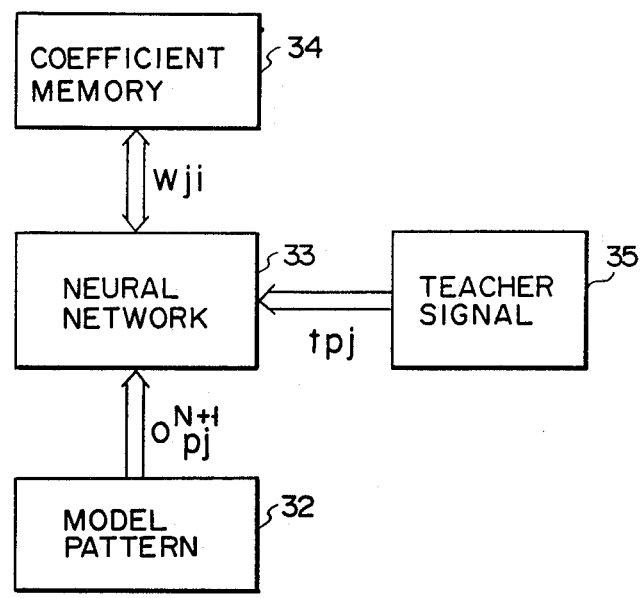
FIG. 13 is a block diagram of an apparatus for causing the neural network of this embodiment to learn.
FIG. 14 is a view showing the layout of photoelectric transducer elements of this embodiment.

This learning system is shown in FIG. 13. A model pattern 32 is an input unit for inputting various object patterns $O_{pj}{}^{N+1}$ to a neural network 33 and includes an A/D converter and the like. Position signals $P_{xy}$ (target values) of the main parts corresponding to the various object patterns $O_{pj}{}^{N+1}$ are input as teacher signals $t_{pj}$ to the neural network 33. The neural network 33 obtains coupling strength coefficients $W_{ji}$ for allowing a coincidence between the actual outputs $O_{pj}{}^0$ and the corresponding teacher signals $t_{pj}$ by learning. The obtained coupling strength coefficients $W_{ji}$ are stored in a coefficient memory 34. This coefficient memory 34 is incorporated in a camera as the coefficient memory 26 of FIG. 1.

The neural network 25 therefore automatically obtains a main part of an object from an object brightness distribution pattern as an output from the arithmetic logic unit 24 and outputs its position $P_{xy}$.

The neural network has a nature for generating an accurate output for a pattern which is not input during learning if learning is performed to some extent. It is very effective to solve problems (e.g., designation of the main part of the object) which involve human senses and are difficult to be standardized. Learning by the neural network allows self-systematization of a relationship between the main parts of the objects and various types of object patterns which could not be programmed by the existing Neumann type computers. Therefore, desirable exposure control can be performed. In addition, high-speed calculations can be performed by parallel processing in the neural network. Therefore, a neural network is suitable for a camera which requires high-speed operations.

In order to achieve effective learning, in the neural network 25, learning is performed in units of rows of the photoelectric transducer elements $P_{mn}$ by independent neural networks S11, ..., and the independent learning results are synthesized by an output layer So, as shown in FIG. 15. The neural network comprises an input layer 37, an intermediate layer 38, and an output layer 39, and the principle of learning has been described above.

For illustrative convenience, the photoelectric transducer elements $P_{mm}$ form a matrix consisting of four rows and seven columns, as shown in FIG. 16. The main part position $p_{xy}$ denotes any of photoelectric transducer element position $P_{mn}$.

Figure 17A:
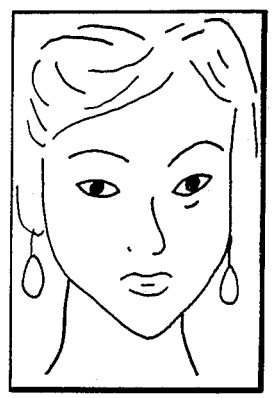
FIGS. 17A to 17C are views showing examples of an object to be learnt by the neural network.
Figure 17B:
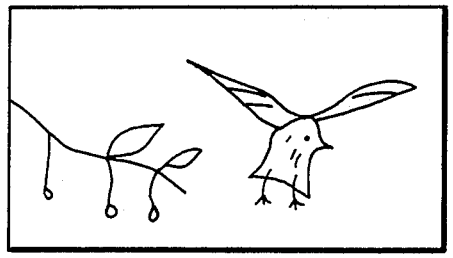
Figure 17C:
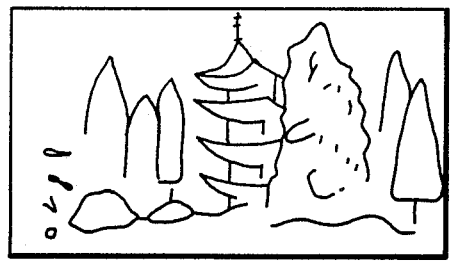

FIGS. 17A to 17C show different objects. In a portrait shown in FIG. 17A, since eyes are to be focused, a main part of the object is represented by the photoelectric transducer element $P_{33}$. In a scene of FIG. 17B, since a bird is to be focused, a main part of the object is represented by the photoelectric transducer element $P_{35}$. In a scene of FIG. 17C, a tower serves as a main part of the object. These object patterns are input to the neural network 25 and are learnt to obtain coupling strength coefficients $W_{ji}$ such that actual outputs coincide with corresponding teacher signals. Therefore, an accurate main part can be always and automatically output regardless of the type of object. Only three object models are exemplified. However, in practice, several hundreds of model patterns are repeatedly learnt.

According to this embodiment as described above, the main parts of objects are learnt by the neural network in accordance with a large number of model patterns. Therefore, there is provided a focus detection apparatus capable of automatically focusing desired areas in all object patterns.

The present invention is not limited to the particular embodiment described above. Various changes and modifications may be made. Other factors such as temperature and humidity may be input as input parameters of the neural network in addition to the brightness values of the object.

What is claimed is:

1. A focus detection apparatus comprising:
   light-receiving means having a plurality of photoelectric transducer elements arranged in a two dimensional matrix;
   an optical system for focusing an object image on said light-receiving means and outputting analog signals representing brightnesses of respective parts of an object;
   means for converting the analog signals output from said light-receiving means into digital signals;
   neural network means for receiving the digital signals output from said converting means and determining a main part of the object;
   means for selecting a signal representing the brightness of the main part determined by said neural network means from the digital signals output from said converting means; and focus detecting means for performing focus detection on the basis of an output from said selecting means.

2. An apparatus according to claim 1, in which said neural network means comprises:
an input layer having a plurality of units, connected to an output of said converting means, for respectively receiving outputs from said photoelectric transducer elements;
one or a plurality of intermediate layers having a plurality of units coupled to individual units of said input layer at predetermined coupling strengths; and
an output layer having a plurality of units coupled to individual units of said intermediate layer at predetermined coupling strengths.

3. An apparatus according to claim 2, in which said neural network means further comprises a coefficient memory for storing coefficients representing the coupling strengths of the units.

4. An apparatus according to claim 1, in which said neural network means comprises a plurality of microprocessors connected in parallel with each other to perform distributed processing.

5. An apparatus according to claim 1, further comprising means for moving said optical system along an optical axis in accordance with an output of said focus detecting means.

6. A focus detection apparatus comprising:
light-receiving means having a plurality of photoelectric transducer elements arranged in a two-dimensional matrix;
an optical system for focusing an object image on said light-receiving means;
neural network means for receiving brightnesses output from said light-receiving means and determining a position of a main part of an object, said neural network means comprising an input layer having a plurality of units for respectively connected to a group of said photoelectric transducer elements, one or a plurality of intermediate layers having a plurality of units coupled to individual units of said input layer at predetermined coupling strengths, an output layer having a plurality of units coupled to individual units of said intermediate layer at predetermined coupling strengths, and
means for causing learning of each unit of said input layer; and
means for performing a focus detection calculation of the object main part.

7. A focus detection apparatus comprising:
light-receiving means having a plurality of photoelectric transducer elements;
an optical system for focusing an object image on said light-receiving means;
neural network means, connected to an output of said light-receiving means, for outputting a signal representing a position of a main part of an object; and
means for performing a focus detection on the basis of a signal selected on the basis of an output of said neural network means from outputs of said light-receiving means.

8. An apparatus according to claim 7, in which said neural network means comprises:
an input layer having a plurality of units connected to the output of said light-receiving means;
one or a plurality of intermediate layers having a plurality of units coupled to the individual units of said input layer at predetermined coupling strengths; and
an output layer having a plurality of units coupled to the individual units of said intermediate layer at predetermined coupling strengths.

9. An apparatus according to claim 8, in which said neural network means further comprises:
means for learning the coupling strengths; and
a memory for storing learning results.

10. A focus detection apparatus comprising:
a plurality of photoelectric transducer elements, arranged in a two-dimensional matrix, for detecting a brightness of an object; and
a back projection model type neural network, having a large number of units coupled to each other at predetermined coupling strengths determined by prelearning, for receiving outputs from said plurality of photoelectric transducer elements and performing a focus calculation.

* * * * *